(12) United States Patent
Kurogi et al.

(10) Patent No.: US 8,708,390 B2
(45) Date of Patent: Apr. 29, 2014

(54) VEHICLE-BODY STRUCTURE OF VEHICLE AND MANUFACTURING METHOD OF THE SAME

(75) Inventors: Osamu Kurogi, Hiroshima (JP); Tsuyoshi Sugihara, Hiroshima (JP); Kohya Nakagawa, Hiroshima (JP); Kuniaki Nagao, Hiroshima (JP); Sakayu Terada, Hiroshima (JP); Miho Kowaki, Hiroshima (JP); Akira Iyoshi, Hiroshima (JP); Shigeaki Watanabe, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 13/600,075

(22) Filed: Aug. 30, 2012

(65) Prior Publication Data

US 2013/0049392 A1    Feb. 28, 2013

(30) Foreign Application Priority Data

Aug. 31, 2011 (JP) .................................. 2011-189060

(51) Int. Cl.
*B62D 25/02* (2006.01)
*B62D 25/20* (2006.01)

(52) U.S. Cl.
USPC ...................... 296/30; 296/203.03; 296/205

(58) Field of Classification Search
USPC ............ 296/29, 30, 205, 209, 187.02, 203.03
See application file for complete search history.

(56) References Cited

U.S. PATENT DOCUMENTS

| 5,131,710 | A | * | 7/1992 | Kamiguchi et al. | 296/76 |
| 5,362,120 | A | * | 11/1994 | Cornille, Jr. | 296/203.01 |
| 5,635,562 | A | * | 6/1997 | Malcolm | 525/108 |
| 5,671,968 | A | * | 9/1997 | Masuda et al. | 296/187.12 |
| 5,921,618 | A | * | 7/1999 | Mori et al. | 296/187.12 |
| 6,293,618 | B1 | * | 9/2001 | Sukegawa et al. | 296/209 |
| 8,403,390 | B2 | * | 3/2013 | Rich et al. | 296/29 |

FOREIGN PATENT DOCUMENTS

| JP | 59-182472 U | 12/1984 |
| JP | 60-097673 U | 7/1985 |
| JP | 2011-201425 A | 10/2011 |
| JP | 2011-255815 A | 12/2011 |
| JP | 2012-017084 A | 1/2012 |

* cited by examiner

*Primary Examiner* — Dennis Pedder
(74) *Attorney, Agent, or Firm* — Studebaker & Brackett PC (57) ABSTRACT

In a vehicle-body structure of a vehicle which comprises vehicle-body forming members forming a closed-section portion and having a dent portion which dents toward an inside of the closed-section portion, and a reinforcing member provided in the closed-section portion and joined to the vehicle-body forming members, a joint portion of the vehicle-body forming members and the reinforcing member includes a rigid joint portion where the vehicle-body forming members and the reinforcing member are joined with a direct contact thereof and a flexible joint portion where the vehicle-body forming members and the reinforcing member are joined via a damping member provided therebetween, and this joint portion is provided at or in the vicinity of the dent portion.

6 Claims, 11 Drawing Sheets

FIG. 1A
Rigid Joint Model A

FIG. 1B
Rigid-Flexible Combined Joint Model B

VEHICLE-BODY STRUCTURE OF VEHICLE AND MANUFACTURING METHOD OF THE SAME

BACKGROUND OF THE INVENTION

The present invention relates to a vehicle-body structure of a vehicle and a manufacturing method of the same.

Vehicles, such as automotive vehicles, are required to increase the rigidity of a vehicle body in order to improve the comfortable ride and the safety. Japanese Utility Model Laid-Open publication Nos. 59-182472 and 60-097673, for example, disclose structures for increasing the rigidity of the vehicle body in which a reinforcing member is provided in a closed-section portion formed by a vehicle-body forming member.

The first one of the above-described patent publications discloses the structure in which the bulkhead is arranged in a bamboo-joint shape in the closed-section portion of the side sill formed by the side sill outer and the side sill inner, and the flanges formed at its periphery are joined to the inner faces of the side sill outer and the side sill inner by both spot welding and an adhesive agent.

The second one of the above-described patent publications discloses the structure in which the bulkhead is arranged in the bamboo-joint shape in the closed-section portion of the front suspension member formed by the upper member and the lower member, and the flanges formed at its periphery are joined to the inner face of the upper member by an adhesive agent for structure.

According to the structures disclosed in the above-described patent publications, however, there is a concern that while improvement of the rigidity is achieved, vibrations occurring at various portions of the vehicle may not be effectively restrained from transmitting to the inside of the vehicle compartment in some cases depending on arrangement positions, shapes, and the like. Therefore, further improvement of the vehicle-body structure has been required in order to properly restrain vibration transmission to passengers for improving the comfortable ride and reducing noises.

SUMMARY OF THE INVENTION

An object of the present invention is to provide a vehicle-body structure of a vehicle or a manufacturing method of the same which can properly restrain the vibration transmission, thereby improve the comfortable ride and reduce the noises of the vehicle, ensuring the sufficient rigidity of the vehicle-body structure.

According to the present invention, there is provided a vehicle-body structure of a vehicle, comprising at least one vehicle-body forming member forming a closed-section portion and having a dent portion which dents toward an inside of the closed-section portion, and a reinforcing member provided in the closed-section portion of the vehicle-body forming member and joined to the vehicle-body forming member, wherein a joint portion of the vehicle-body forming member and the reinforcing member includes a rigid joint portion where the vehicle-body forming member and the reinforcing member are joined with a direct contact thereof and a flexible joint portion where the vehicle-body forming member and the reinforcing member are joined via a damping member provided therebetween, and the joint portion is provided at or in the vicinity of the dent portion of the vehicle-body forming member.

According to the present invention, since the reinforcing member is provided in the closed-section portion formed by a single vehicle-body forming member made in a hollow-tube shape, or plural vehicle-body forming members joined together, for example, the rigidity of the vehicle-body forming member(s) and a portion of the vehicle body formed by the vehicle-body forming member(s) can be improved, so that any deformation of that portion, collapse of the closed-section portion, or the like can be properly restrained. In this case, since the joint portion of the vehicle-body forming member and the reinforcing member includes the rigid joint portion by using welding, bolt fastening or the like as well as the flexible joint portion by using the damping member, the vehicle-body forming member and the reinforcing member can be joined together firmly with the rigid joint portion, thereby improving the rigidity, and vibrations of the vehicle-body forming member(s) can be properly reduced by the damping member provided at the flexible joint portion. Thereby, the above-described vibration transmission can be properly restrained, ensuring the sufficient rigidity of the vehicle-body structure, so that the comfortable ride can be properly improved and the noises can be properly reduced. Herein, the present invention may not require any additional members to restrain the vibration transmission, so that the above-described effects can be advantageously provided, avoiding any improper weight increase of the vehicle body or the like. Further, since the joint portion of the vehicle-body forming member(s) and the reinforcing member is provided at or in the vicinity of the dent portion of the vehicle-body forming member(s) which dents toward the inside of the closed-section portion, it can be effectively restrained that the deformation or collapse of the closed-section portion start from the dent portion of the closed-section portion where a stress concentration may occur easily, and also the vibrations of the vehicle-body forming member(s) can be effectively reduced at the dent portion of the closed-section portion where a strain-energy concentration may occur easily.

According to an embodiment of the present invention, another vehicle-body forming member which is different from the at least one vehicle-body forming member is joined to an outer face of the dent portion. Thereby, the vibrations transmitted between the vehicle-body forming member(s) forming the closed-section portion and the other vehicle-body forming member can be effectively reduced, thereby providing the above-described effect more effectively.

According to another embodiment of the present invention, the damping member is a viscoelastic member having physical properties which fall within a range enclosed by six coordinate points: (1, 0.4), (1, 0.2), (2, 0.1), (1000, 0.1), (10000, 0.2) and (10000, 0.4) in an X-Y coordinate system with X axis of the storage modulus and Y axis of the loss factor, or a range exceeding the loss factor of 0.4. Thereby, since the viscoelastic member is used as the damping member and the storage modulus and the loss factor as its physical properties are specified as any values falling within the specified range which has been confirmed as an effective range capable of providing the vibration-damping effect, the above-described damping effect of vibrations of the vehicle-body forming member(s) according to the present invention can be surely provided.

According to another embodiment of the present invention, the reinforcing member is a bulkhead having at least one flange portion provided at a periphery thereof, and the joint portion is provided at the flange portion. Thereby, the above-described effects of rigidity improvement and vibration damping by the joint portions can be surely provided as an appropriate concrete structure.

According to another embodiment of the present invention, the rigid joint portion and the flexible joint portion are provided at one flange portion of the bulkhead. Thereby, the joint strength of the bulkhead to the vehicle-body forming member can be ensured and the vibration-damping effect can be provided by the joint portion of the flange portion According to another embodiment of the present invention, the closed-section portion of the vehicle-body forming member is comprised of two vehicle-body forming members. Thereby, the above-described effects can be provided at a specified portion where the closed-section portion is formed by the two vehicle-body forming members, such as a side sill, a pillar, or a roof rail.

According to anther aspect of the present invention, there is provided a manufacturing method of a vehicle-body structure of a vehicle which comprises at least one vehicle-body forming member forming a closed-section portion and having a dent portion which dents toward an inside of the closed-section portion and a reinforcing member provided in the closed-section portion of the vehicle-body forming member and joined to the vehicle-body forming member, the method comprising a step of joining the vehicle-body forming member and the reinforcing member at a position which is located at or in the vicinity of the dent portion of the vehicle-body forming member, wherein the joining step includes a rigid joining step of joining the vehicle-body forming member and the reinforcing member with a direct contact thereof and a flexible joining step of joining the vehicle-body forming member and the reinforcing member via a damping member provided therebetween. A vehicle-body structure of a vehicle manufactured by this method can provide the same effects described above for the present invention.

Other features, aspects, and advantages of the present invention will become apparent from the following description which refers to the accompanying drawings.

DETAILED DESCRIPTION OF THE INVENTION

Hereinafter, preferred embodiments of the present invention will be described referring to the accompanying drawings.

Firstly, the results of simulation which has been conducted for a structure specified in claims of the present invention will be described prior to descriptions of a concrete application structure to a vehicle body.

Figure 1A:
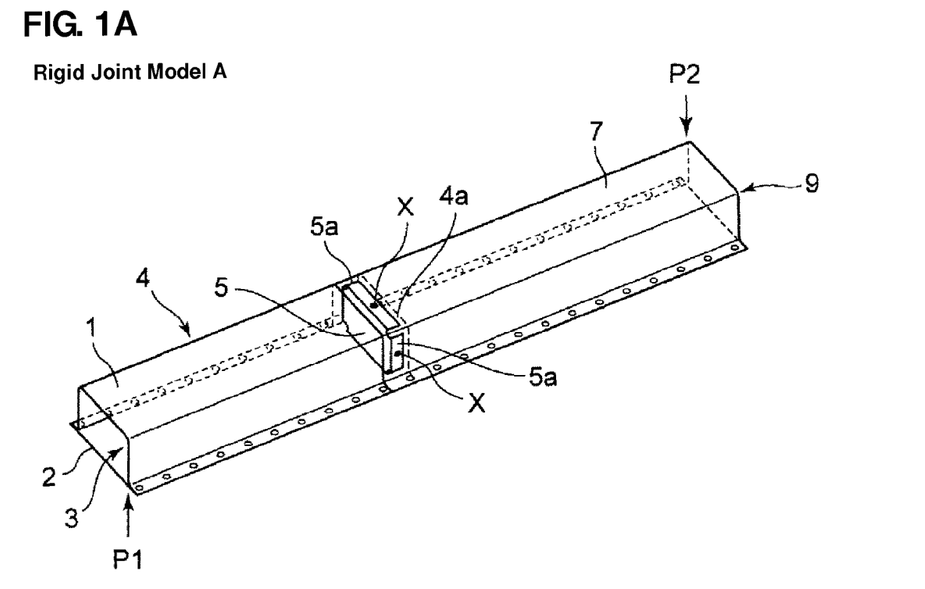
FIGS. 1A and 1B are diagrams showing models used for simulation according to an embodiment of the present invention.
Figure 1B:
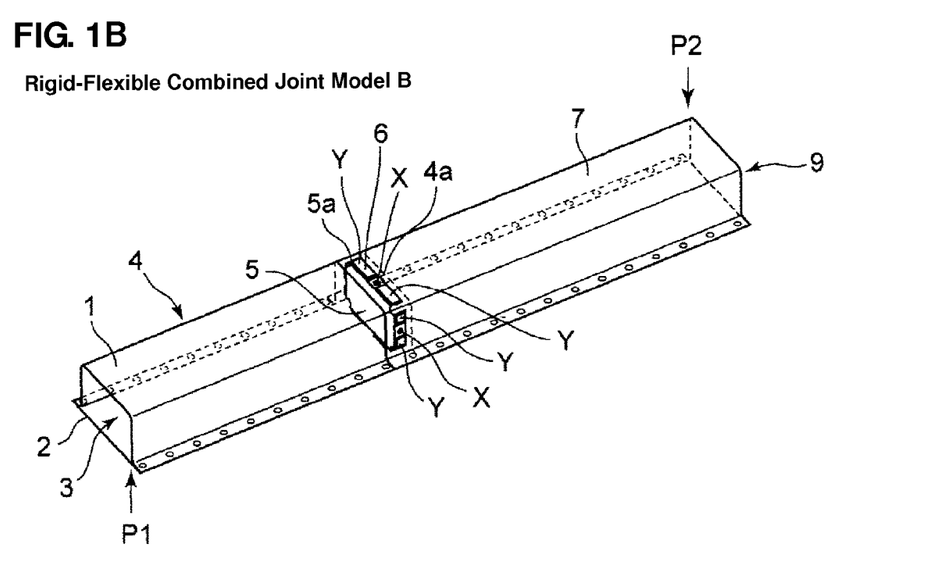

FIGS. 1A and 1B are diagrams showing models used for simulation according to an embodiment of the present invention. FIGS. 1A and 1B show a rigid joint model A and a rigid-flexible combined joint model B which have been used as simulations, respectively. In each model shown in FIGS. 1A and 1B, a first member 1 having a U-shaped section and a second member 2 having a flat-plate shape are used as vehicle-body forming members, which form a hollow frame 4 having a closed-section portion 3 with a rectangular section by joining both-side end portions of the second member 2 to respective flanges formed at both sides of the first member 1.

The second member 2 is configured to be longer than the first member 1, and a third member 7 having a U-shaped section which is substantially similar to the first member 1 is joined to the second member 2 continuously from the first member 1. Both-side flange portions of the third member 7 are respectively joined to both-side end portions of the second member 2, so that a substantially rectangular closed-section portion 9 is continuous to the closed-section portion 3.

Further, the first member 1 has a dent portion 4a at an upper face portion and both-side side face portions of its end portion which is located on the side of the third member 7. This dent portion 4a is configured to dent toward the inside of the closed-section portion 3 by a specified distance which is substantially equal to the thickness of the third member 7. Thus, the third member 7 is joined to the dent portion 4a of the first member 1, overlapping with an upper face of the dent portion 4a, so that both a surface of the first member 1 and a surface of the third member 7 are continuously flat.

A bulkhead 5 is provided in the closed-section portion 3 of the hollow frame 4. The bulkhead 5 is fixed in the hollow frame 4 by joining flange portions 5a formed at its four peripheral sides to inner faces of the first and second members 1, 2, respectively. The bulkhead 5 is fixed in the hollow frame 4 at the dent portion 4a of the first member 1.

In the rigid joint model A shown in FIG. 1A, the flange portions 5a of the bulkhead 5 are joined to the first and second members 1, 2 at each central portion thereof by spot welding. In the rigid-flexible combined joint model B shown in FIG. 1B, the flange portions 5a of the bulkhead 5 are joined to the inner faces of the first and second members 1, 2 at each central portion thereof by spot welding and also at each both sides thereof via damping members 6, 6. Herein, the above-described joint portion with the spot welding constitutes a rigid joint portion X and the above-described joint portion with the damping member 6 constitutes a flexible joint portion Y.

Herein, while the rigid-flexible combined joint model B equipped with both the rigid joint portion X and the flexible joint portion Y has a higher rigidity than the rigid joint model A equipped with only the rigid joint portion X and therefore there exists a difference in the resonance frequency between the models A, B, in order to compare these models properly by making their resonance frequency uniform, the area of the rigid joint portion X of the model A is set to be slightly larger than that of the rigid joint portion X of the model B. Further, the damping member 6 provided at the flexible joint portion Y is comprised of a viscoelastic member which has the loss factor of 0.4 and the storage modulus of 200 MPa (20° C., 30 Hz).

Figure 2:
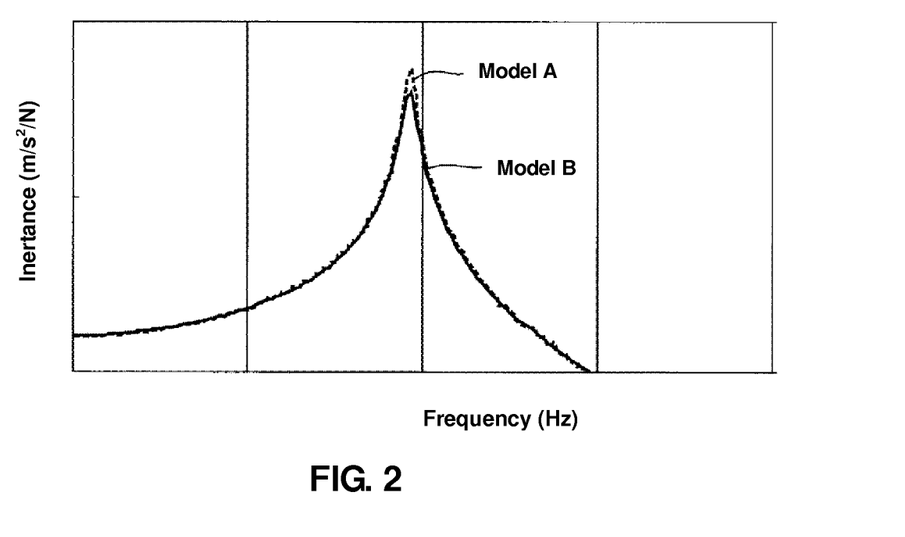
FIG. 2 is a graph showing characteristics of the inertance for the frequency of the simulation.

FIG. 2 is a graph showing characteristics of the inertance for the frequency of the simulation. Herein, in each of the models A, B, a specified corner portion of the closed-section portion 3 at one end of the hollow frame 4 is set as an exciting point P1 and a corner portion of the closed-section portion 9 at its another end which is positioned diagonally to the above-described specified corner portion is set as a responsive point P2. FIG. 2 shows a comparison of the respective inertance (a magnitude of an acceleration amplitude per an exciting force: $m/s^2/N$). The model A is shown by a broken line, and the model B is shown by a solid line in FIG. 2. As apparent from FIG. 2, a peak value of the inertance of the rigid-flexible combined joint model B is lower than that of the rigid joint model A. Accordingly, it is shown that the amount of damping occurring in the process of vibration transmission becomes larger with providing the flexible joint portion Y.

Figure 3:
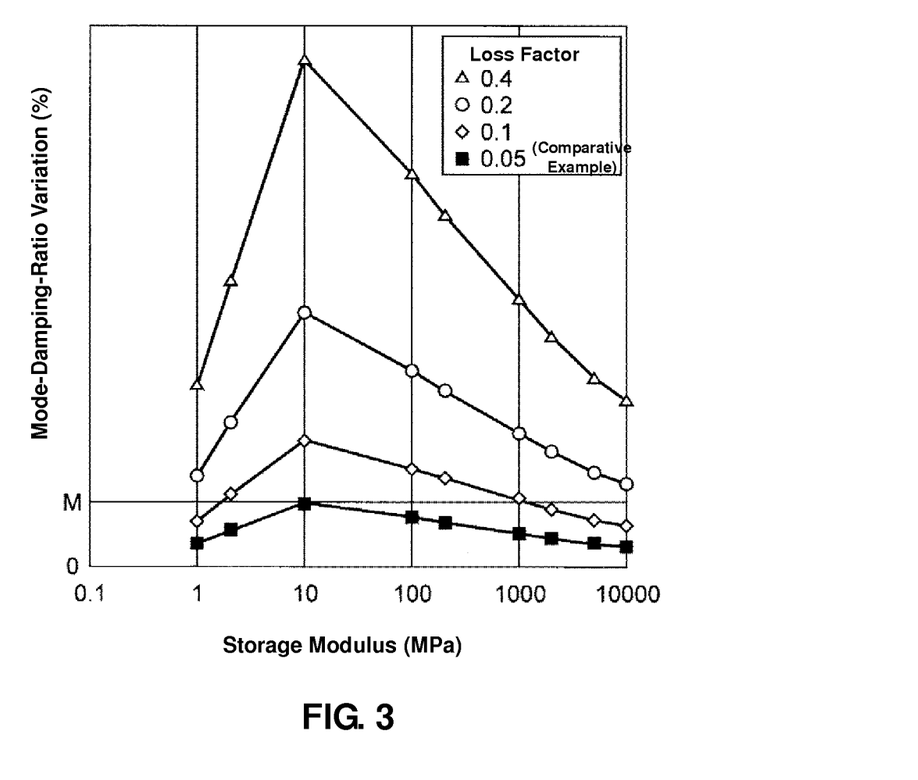
FIG. 3 is a graph showing characteristics of a mode-damping-ratio variation for the loss factor and the storage modulus of a damping member.

FIG. 3 is a graph showing characteristics of a mode-damping-ratio variation for the loss factor and the storage modulus of a damping member. FIG. 3 shows simulation results of the mode-damping-ratio variation characteristic for the storage modulus and the loss factor when using plural viscoelastic members having different values of the loss factor as the damping member 6 in the above-described rigid-flexible combined joint model B. Herein, the damping member having the loss factor of 0.05 is a comparative sample, which is an adhesive agent for structure generally used in the vehicle body.

As apparent from FIG. 3, it is shown that the mode-damping-ratio variation in a case of using the viscoelastic member is greater than that in a case of using the general adhesive agent for structure (the loss factor of 0.05), thereby damping the vibration more easily. In particular, it is shown that the mode-damping-ratio variation becomes greater as the loss factor becomes greater, and that the mode-damping-ratio variation becomes the maximum when the storage modulus is 10 MPa regardless of the value of the loss factor.

Figure 4:
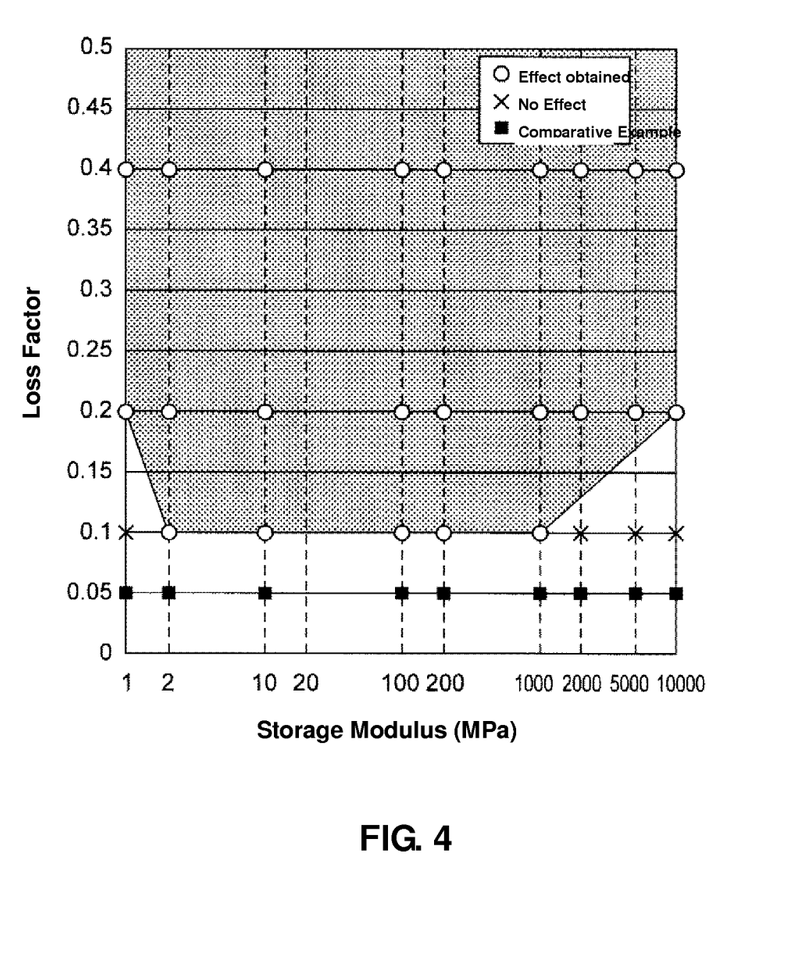
FIG. 4 is a graph showing relationships of the loss factor and the storage modulus when a damping effect is substantially obtained in a case in which a viscoelastic member is used as the damping member.

FIG. 4 shows relationships between the loss factor and the storage modulus which can substantially obtain the damping effect in a case in which the viscoelastic member is used as the damping member 6 from the simulation results of FIG. 3. In this figure, it is determined that the effect can be obtained in a case in which the mode-damping-ratio variation is a threshold M or greater shown in FIG. 3, while no effect can be obtained in a case in which the mode-damping-ratio variation is less than the threshold M.

Consequently, it has been found that the damping effect can be obtained in substantially a range enclosed by six coordinate points: (1, 0.4), (1, 0.2), (2, 0.1), (1000, 0.1), (10000, 0.2) and (10000, 0.4) in an X-Y coordinate system with X axis of the storage modulus and Y axis of the loss factor, and a range exceeding the loss factor of 0.4.

Next, specific examples in which the structure of the present invention is applied to the vehicle body will be described.

Figure 5:
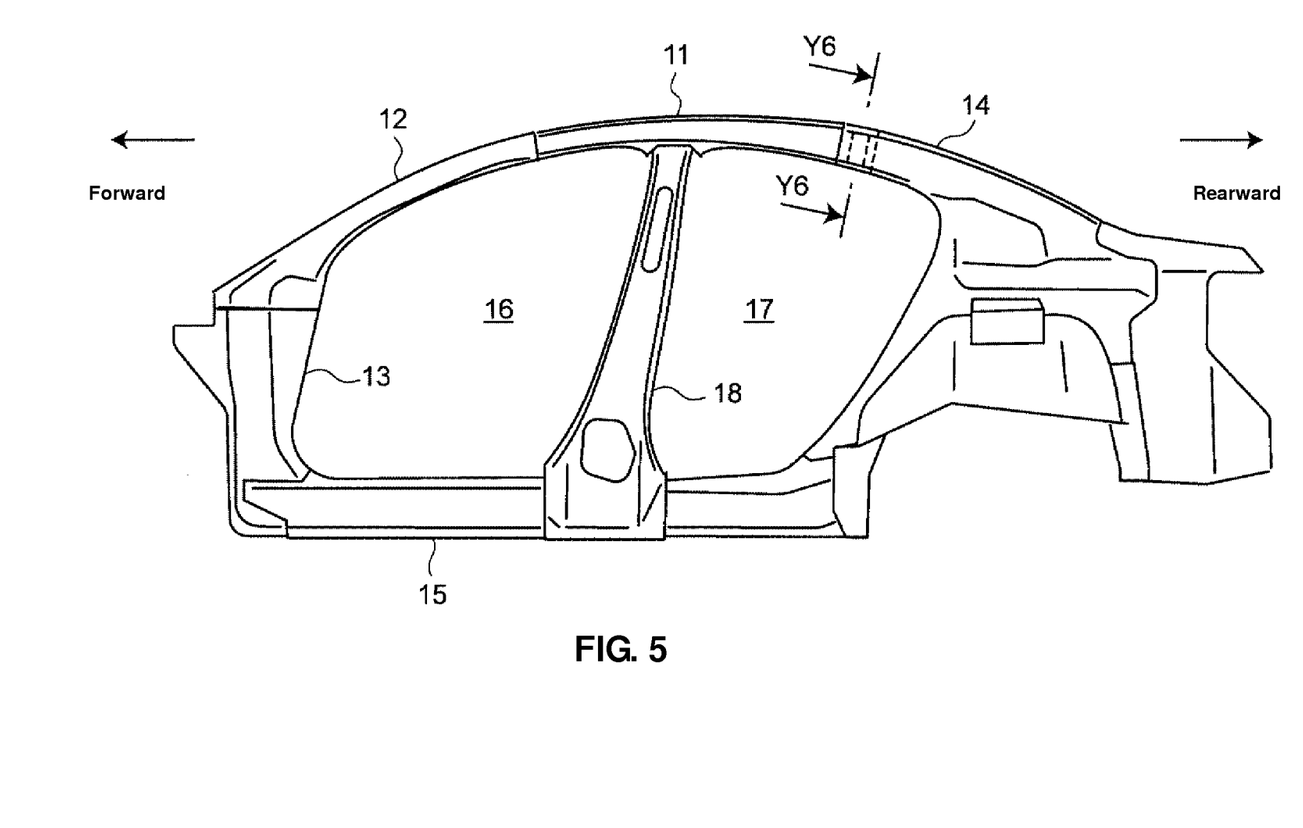
FIG. 5 is a view showing a side portion of a vehicle body to which a vehicle-body structure of a vehicle according to a first embodiment of the present invention is applied.

FIG. 5 is a view showing a side portion of a vehicle body to which a vehicle-body structure of a vehicle according to a first embodiment of the present invention is applied. As shown in FIG. 5, there are provided, as members constituting the side portion of the vehicle body to which the vehicle-body structure of a vehicle according to the first embodiment of the present invention is applied, a roof rail 11 which extends in the vehicle longitudinal direction at an upper portion of the vehicle body, a front pillar 12 which extends forward from a front end portion of the roof rail 11, a hinge pillar 13 which extends downward from a front end portion of the front pillar 12, a rear pillar 14 which extends rearward from a rear end portion of the roof rail 11 and a rear end portion of which extends downward, a side sill 15 which extends in the vehicle longitudinal direction at a lower portion of the vehicle body and is joined to the hinge pillar 13 and the rear pillar 14, and a center pillar 18 which extends vertically between front and rear door opening portions 16, 17 and is joined to the roof rail 11 and the side sill 15.

Figure 6:
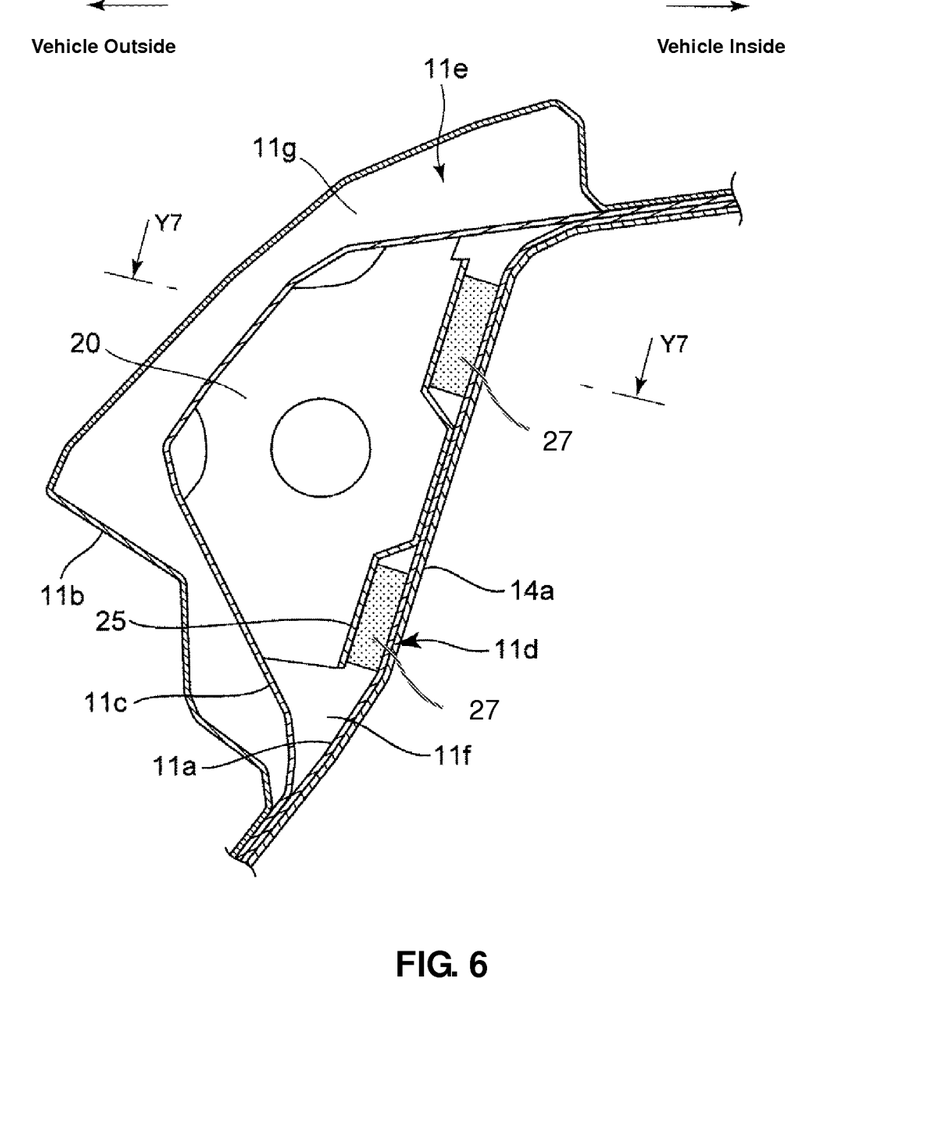
FIG. 6 is a sectional view taken along line Y6-Y6 of FIG. 5.

FIG. 6 is a sectional view taken along line Y6-Y6 of FIG. 5. The roof rail 11 comprises, as shown in FIG. 6, a roof rail inner 11a which forms a vehicle-body inside of the roof rail 11, a roof rail outer 11b which forms a vehicle-body outside of the roof rail 11, and a roof rail reinforcement 11c which is arranged between the roof rail inner 11a and the roof rail outer 11b. Respective inside and lower end portions of these members 11a, 11b, 11c are joined together.

Thus, a closed-section portion 11e of the roof rail 11 which is formed by the roof rail inner 11a and the roof rail reinforcement 11b is divided by the roof rail reinforcement 11c, a closed-section portion 11f is formed by the roof rail inner 11a and the roof rail reinforcement 11c, and a closed-section portion 11g is formed by the roof rail outer 11b and the roof rail reinforcement 11c.

Figure 7:
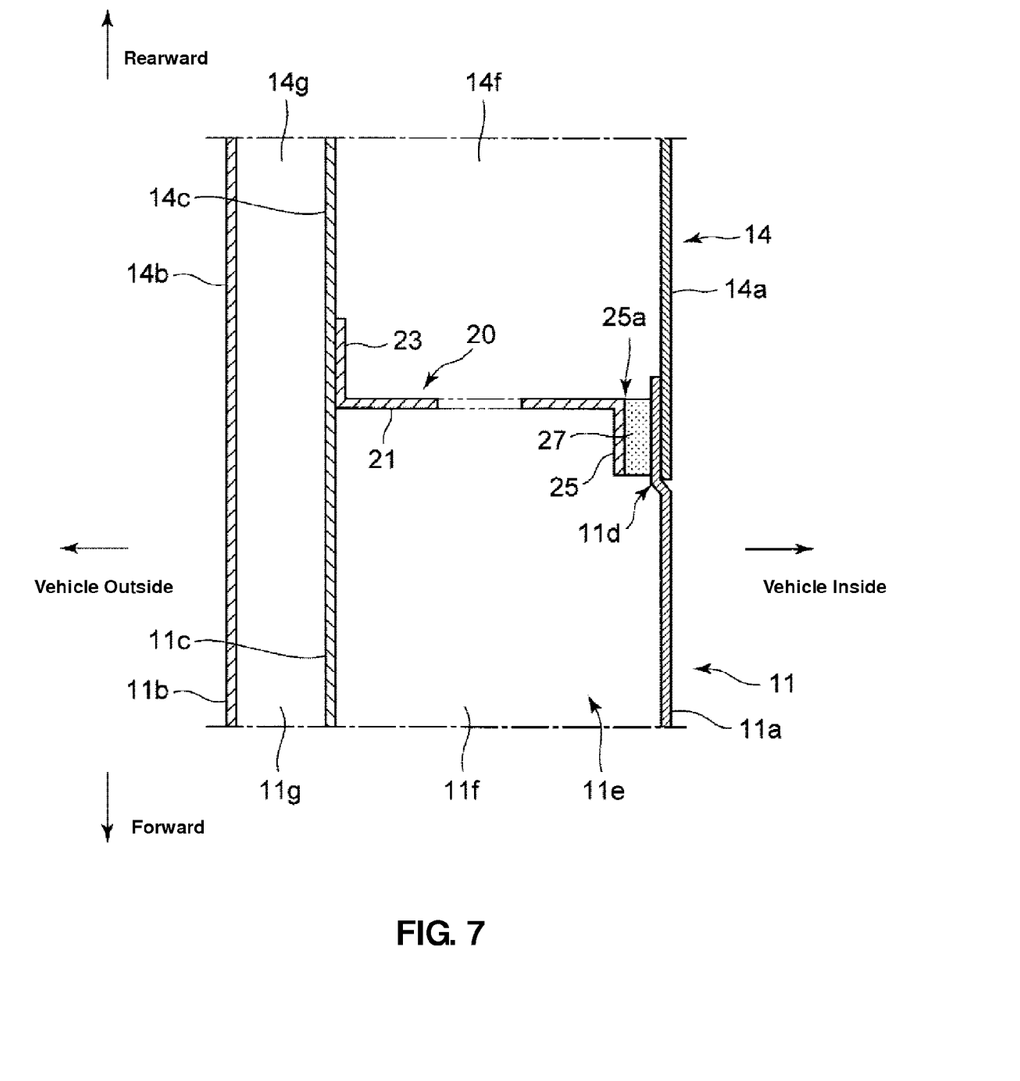
FIG. 7 is a sectional view taken along line Y7-Y7 of FIG. 6.

FIG. 7 is a sectional view taken along line Y7-Y7 of FIG. 6. As shown in FIG. 7, the roof rail inner 11c has a dent portion 11d at its rear end portion. This dent portion 11d is configured to dent toward the inside of the closed-section portion 11f by a specified distance which is substantially equal to the thickness of the rear pillar inner 14a, which will be described later. A front end portion of the rear pillar inner 14a which has substantially the same shape as a rear end portion of the roof rail inner 11a is joined to the dent portion 11d of the roof rail inner 11a, overlapping with an upper face (on the vehicle-inside) of the dent portion 4a, as described later.

The rear pillar 14 extending rearward from the rear end portion of the roof rail 11 comprises a rear pillar inner 14a which forms a vehicle-body inside of the rear pillar 14, a rear pillar outer 14b which forms a vehicle-body outside of the rear pillar 14, and a rear pillar reinforcement 14c which is arranged between the rear pillar inner 14a and the rear pillar outer 14b. Respective both-side end portions, in the vehicle width direction, of these three members 14a, 14b, 14c are joined together at the front end portion of the rear pillar 14.

Thus, a closed-section portion 14f of the rear pillar 14 is formed by the rear pillar inner 14a and the rear pillar reinforcement 14c, and a closed-section portion 14g of the rear pillar 14 is formed by the rear pillar outer 14b and the rear pillar reinforcement 14c.

According to the present embodiment, as shown in FIG. 7, the rear pillar outer 14b is formed integrally with the roof rail outer 11b, and the rear pillar reinforcement 14c is formed integrally with the roof rail reinforcement 11c. Meanwhile, the rear pillar inner 14a is comprised of another vehicle-body forming member that is different from the roof rail inner 11a. The front end portion of the rear pillar inner 14a is joined to the upper face of the dent portion 11d formed at the rear end portion of the roof rail inner 11a so that a surface (on the vehicle-inside) of the roof rail inner 11a and a surface (on the vehicle-inside) of the rear pillar inner 14a are continuously flat.

Further, a bulkhead 20 as a reinforcing member is provided in the closed-section portion 11f of the roof rail 11 which is formed by the roof rail inner 11a and the roof rail reinforcement 11c at a specified position where the dent portion 11d denting toward the inside of the closed-section portion 11f is provided.

Figure 8:
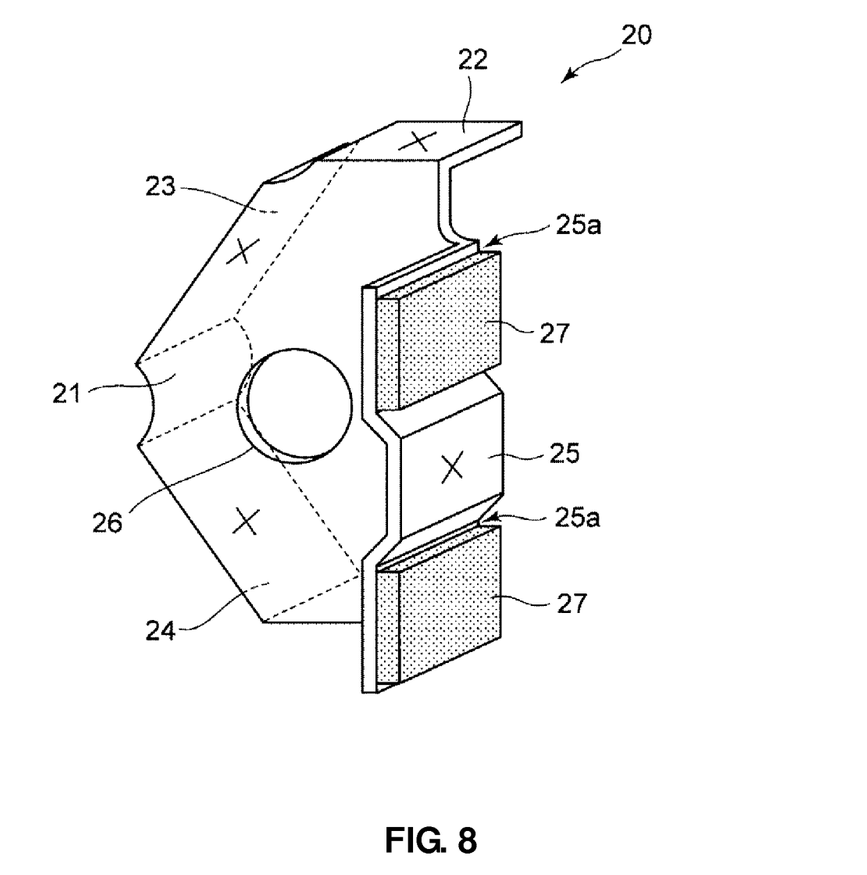
FIG. 8 is a perspective view showing a bulkhead as a reinforcing member according to the first embodiment of the present invention.

FIG. 8 is a perspective view showing the bulkhead as the reinforcing member according to the first embodiment of the present invention. FIG. 8 shows a state in which a damping member is attached to the bulkhead. The bulkhead 20 comprises, as shown in FIG. 8, a partition face portion 21 which partitions the closed-section portion 11f, a first flange portion 32 which is provided at an upper side portion of the partition face portion 21 and extends rearward, second and third flange portions 23, 24 which are provided at a vehicle-outside side portion of the partition face portion 21 and extend rearward, and a fourth flange portion 25 which is provided at a vehicle-inside side portion of the partition face portion 21 and extends forward. A seat portion 25a is formed at the fourth flange portion 25 in a recess shape so as to accommodate viscoelastic members 27 therein, which will be described. Herein, a hole portion 26 is formed at the partition face portion 21 for weight reduction.

The first, second and third flange portions 22, 23, 34 of the bulkhead 20 are joined to the roof rail reinforcement 11c respectively by spot welding. The fourth flange portion 25 of the bulkhead 20 faces to the inner face of the roof rail inner 11a and is joined to the roof rail inner 11a by spot welding. The viscoelastic members 27 as the vibration damping member which are placed and adheres onto the seat portion 25a of the fourth flange portion 25 are made adhere to the inner face of the roof rail inner 11a. Thus, the fourth flange portion 25 is joined to the roof rail inner 11a via the viscoelastic members 27.

In a state in which the bulkhead 20 is provided in the closed-section portion 11f formed by the roof rail inner 11a and the roof rail reinforcement lower 11c, the spot-welding joint portions of the bulkhead 20 constitute the rigid joint portions. Meanwhile, the joint portions via the viscoelastic members constitute the flexible joint portions. In FIG. 8, the spot-welding portions of the bulkhead 20 are shown by x marks.

Herein, the viscoelastic member 27 having the physical properties which fall within the range enclosed by six coordinate points: (1, 0.4), (1, 0.2), (2, 0.1), (1000, 0.1), (10000, 0.2) and (10000, 0.4) in the X-Y coordinate system with X axis of the storage modulus and Y axis of the loss factor, or the range exceeding the loss factor of 0.4 may be preferably used. A viscoelastic member similar to the above-described viscoelastic member 27 may be preferably used in a second embodiment which will be described below.

While the hollow frame formed by the roof rail inner 11a and the roof rail reinforcement 11c and the bulkhead 20 are joined together at the dent portion 11d denting toward the inside of the closed-section portion of the roof rail inner 11a in the present embodiment, they may be joined together at a position which is located in the vicinity of the dent portion 11d.

Further, while the bulkhead 20 is joined in the closed-section portion 11f formed by the roof rail inner 11a and the roof rail reinforcement lower 11c in the present embodiment, it may be joined in a closed-section portion which is formed by a single vehicle-body forming member or three or more vehicle-body forming members.

As described above, according to the vehicle-body structure of a vehicle according to the first embodiment of the present invention, the rigidity of the closed-section portion 11f can be improved by the bulkhead 20 which is provided in the closed-section portion 11f formed by the roof rail inner 11a and the roof rail reinforcement 11c, so that any deformation, collapse of the closed-section portion 11f and the like can be restrained.

In this case, since the first, second and third flange portions 22, 23, 34 of the bulkhead 20 are rigidly joined to the roof rail reinforcement 11c by spot welding, the fourth flange portion 25 of the bulkhead 20 is rigidly joined to the roof rail inner 11a by spot welding as well as flexibly joined to the roof rail inner 11a via the viscoelastic members 27, the bulkhead 20 can be firmly joined to the roof rail reinforcement 11c and the roof rail inner 11a with the rigid joint portions, thereby providing the rigid-improvement effect, and the vibration of the closed-section portion 11f can be reduced with the flexible joint portions, thereby restraining the vibration transmission to passengers in the vehicle compartment.

Thereby, the vibration transmission can be properly restrained, ensuring the sufficient rigidity of the vehicle-body structure, so that the comfortable ride can be improved and the noises can be reduced. Herein, it may not be required to provide any additional member to restrain the vibration transmission, so that the above-described effects can be advantageously provided, avoiding any improper weight increase of the vehicle body or the like.

Further, since the rear pillar inner 14a as a vehicle-body forming member which is different from the roof rail inner 11a is joined to the outer face of the dent portion 11d of the roof rail inner 11a forming the closed-section portion 11f, the vibration transmission between the roof rail inner 11a and the roof rail reinforcement 11c which form the closed-section portion 11f and the rear pillar inner 14a can be effectively reduced.

Hereinafter, the method of manufacturing the roof rail 11 to which the vehicle-body structure of a vehicle according to the above-described first embodiment of the present invention is applied will be described. Firstly, the bulkhead 20 is made contact the roof rail reinforcement 11c and then the first, second and third flange portions 22, 23, 34 of the bulkhead 20 are welded to the roof rail reinforcement 11c, respectively. Herein, the bulkhead 20 is positioned at a specified position such that the fourth flange portion 25 is joined to the dent portion 11d of the roof rail inner 11a.

Then, a one-side face of each of the sheet-shaped viscoelastic members 27 is made adhere to the seat portion 25a of the fourth flange portion 25 of the bulkhead 20 with its own adhesive force. After this, the roof rail inner 11a is arranged so as to cover over the fourth flange portion 25 of the bulkhead 20 equipped with the viscoelastic members 27, and the fourth flange portion 25 of the bulkhead 20 and the roof rail inner 11a are welded together. Herein, the other-side face of each of the sheet-shaped viscoelastic members 27 adhering to the fourth flange portion 25 of the bulkhead 20 is pressed against to the inner face of the roof rail inner 11a and made adhere to the inner face of the roof rail inner 11a.

Next, the rear pillar inner 14a is arranged so as to cover over the vehicle-inside of the roof rail inner 11a, and the roof rail outer 11b is arranged so as to cover over the vehicle-outside of the roof rail reinforcement 11e. Then, the respective upper and lower flange portions of the roof rail outer 11b, the roof rail reinforcement 11e, the roof rail inner 11a, and the rear pillar inner 14a are joined together. Thus, the roof rail 11 is manufactured.

While the bulkhead 20 is rigidly joined to the roof rail inner 11a and the roof rail reinforcement 11e by spot welding in the present embodiment, they may be rigidly joined together by bolt fastening with bolts and nuts.

Further, the above-described bulkhead 20 comprises the one sheet-shaped partition face portion 21 as a partition wall portion which partitions the closed-section portion 11f, another type of bulkhead which comprises two sheet-shaped partition face portions which partition the closed-section portion 11f and a connection portion which interconnects these partition face portions may be used. In this case, the other type of bulkhead may be also joined to the vehicle-body forming member forming the closed-section portion with the rigid joint portion where they are joined with the direct contact thereof and the flexible joint portion where they are joined via the damping member provided therebetween. Thereby, the rigidity-improvement effect by the above-described bulkhead can extend over a properly-wide area of the vehicle-body forming member forming the closed-section portion. Further, the number of parts can be reduced by half, compared with a case in which two separate bulkheads are arranged at two adjacent positions in the closed-section portion, thereby improving efficiencies of parts management and assembling works.

Figure 9:
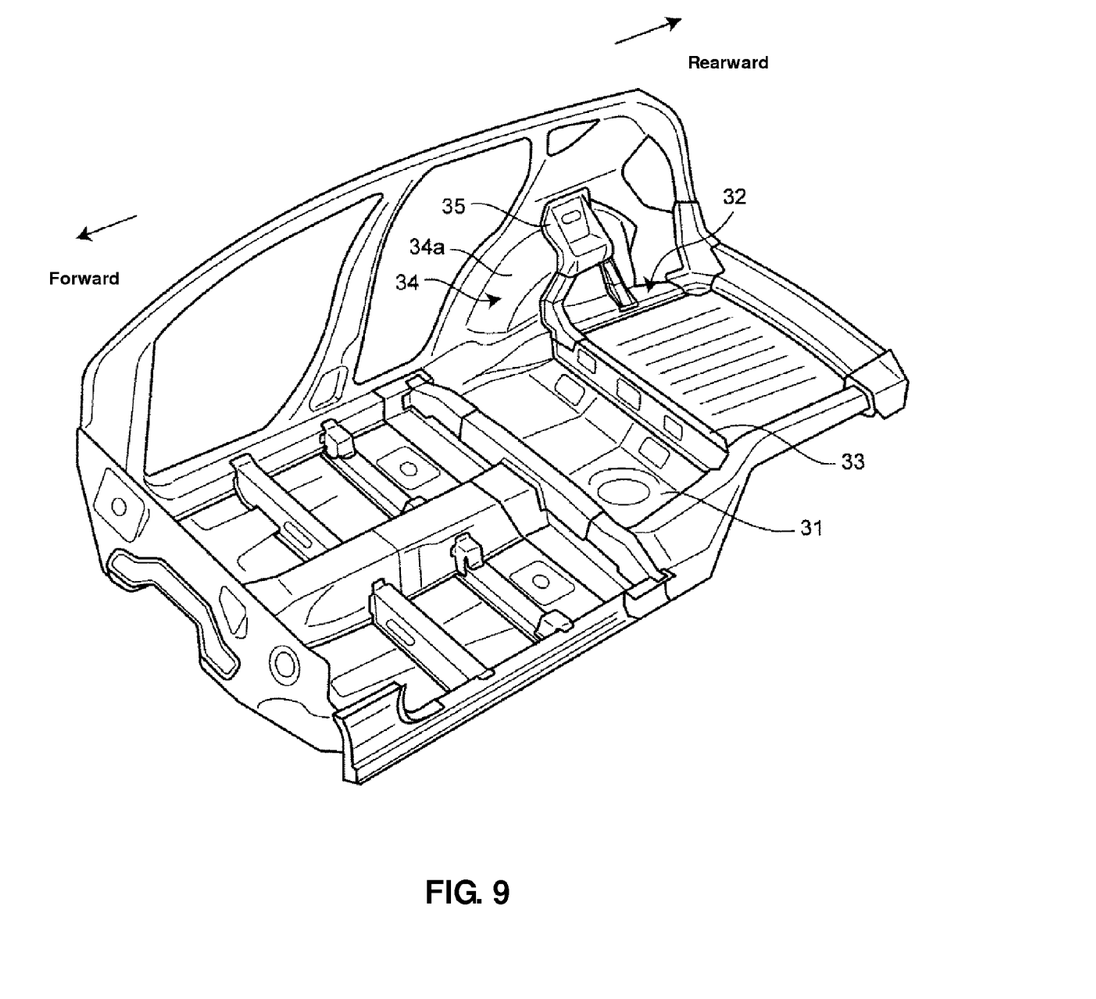
FIG. 9 is a view showing a rear portion of a vehicle body to which a vehicle-body structure of a vehicle according to a second embodiment of the present invention is applied.
Figure 10:
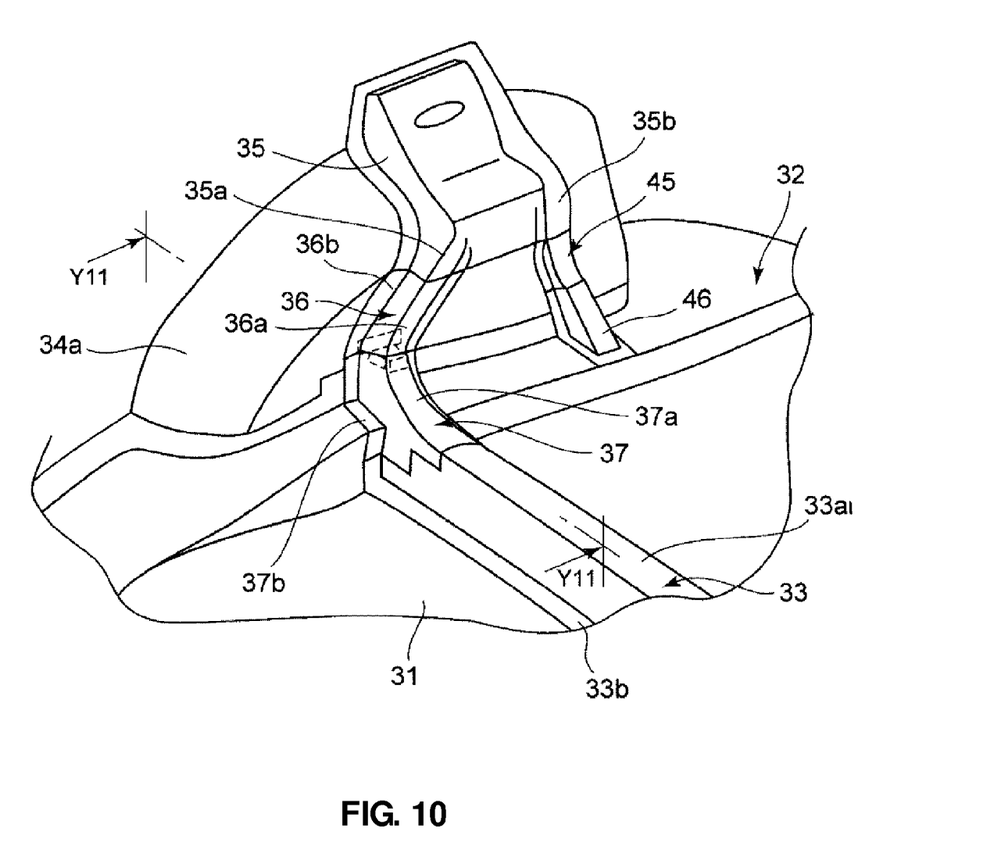
FIG. 10 is an enlarged view of a major part of FIG. 9.
Figure 11:
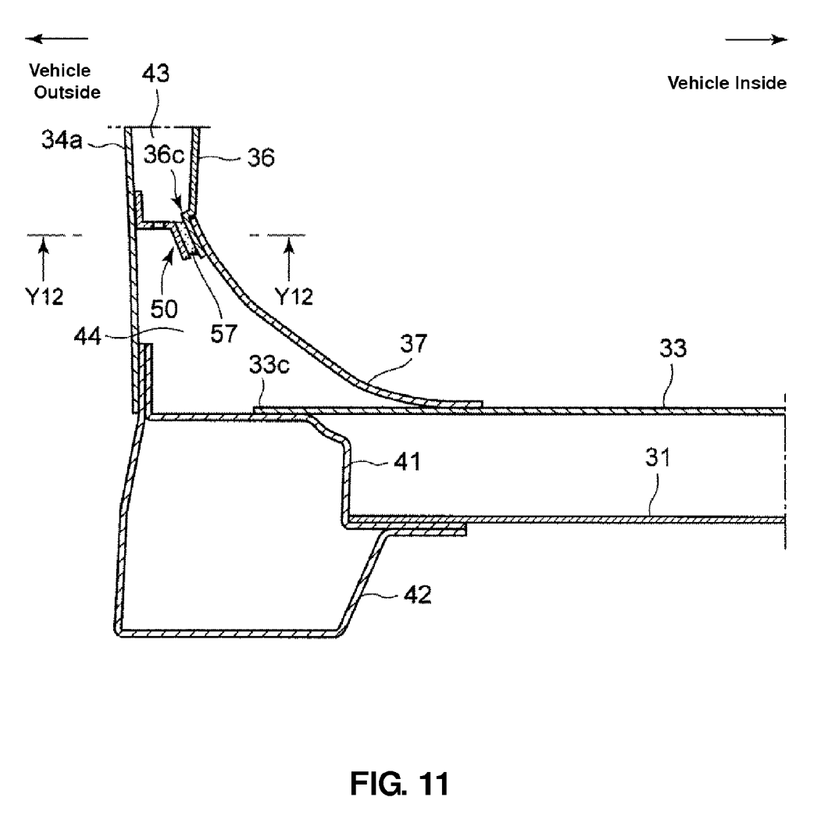
FIG. 11 is a sectional view taken along line Y11-Y11 of FIG. 10.
Figure 12:
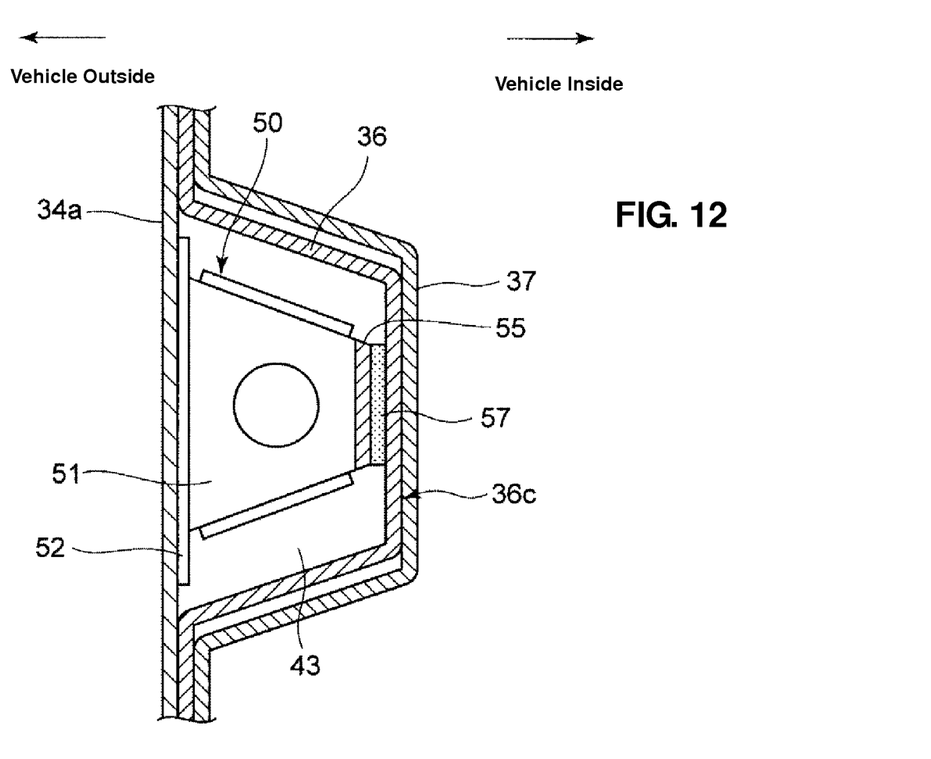
FIG. 12 is a sectional view taken along line Y12-Y12 of FIG. 11.

FIG. 9 is a view showing a rear portion of a vehicle body to which a vehicle-body structure of a vehicle according to a second embodiment of the present invention is applied, FIG. 10 is an enlarged view of a major part of FIG. 9, FIG. 11 is a sectional view taken along line Y11-Y11 of FIG. 10, and FIG. 12 is a sectional view taken along line Y12-Y12 of FIG. 11.

As shown in FIG. 9, there are provided, as members constituting the rear portion of the vehicle body to which the vehicle-body structure of a vehicle according to the second embodiment of the present invention is applied, a floor panel 31 which forms a floor face of the vehicle body, a pair of rear side frames 32 which extends in the vehicle longitudinal direction at both-side end portions of the floor panel 31, a cross member 33 which extends in the vehicle width direction on the floor panel 31 and is joined to the right and left rear side frames 32, and a pair of rear wheel houses 34 which accommodates a pair of rear wheels (not illustrated).

The rear wheel house 34 is comprised of a rear-wheel-house inner 34a which protrudes toward the vehicle inside and a rear-wheel-house outer (not illustrated) which protrudes toward the vehicle outside. A suspension housing member 35 to support a suspension (not illustrated) is attached to the rear-wheel-house inner 34a, and this suspension housing member 35 has protrusion portions 35a, 35b which protrude toward the vehicle inside at its front and rear portions.

Further, a first side brace member 36 which has a U-shaped section and extends downward from the front protrusion portion 35a of the suspension housing member 35 and a second side brace member 37 which has a U-shaped section and extends downward from a lower end portion of the first side brace member 36 are attached to the rear-wheel-house inner 34a.

The second side brace member 37 is joined to the first side brace member 36 in a state in which an upper end portion of the second side brace member 37 covers over a vehicle-compartment side of the lower end portion of the first side brace member 36. The second side brace member 37 extends downward, and is joined to the rear side frame 32 extending in the vehicle longitudinal direction and the cross member 33 extending in the vehicle width direction.

The first and second side brace members 36, 37 respectively comprise protrusion portions 36a, 37a which protrude toward the vehicle inside and flange portions 36b, 37b which extend in front and back of the protrusion portions 36a, 37a. The protrusion portions 35a, 36a, 37a of the suspension housing member 35 and the first and second side brace members 36, 37 and the protrusion portion 33a of the cross member 33 are located substantially on a straight line.

The cross member 33 has a U-shaped section, and its flange portion 33b extending in the vehicle longitudinal direction is joined to the floor panel 31. A vehicle-outside flange portion 33c of the cross member 33 which is formed to be continuous to the protrusion portion 33a is joined to a rear-side-frame upper 41 which forms an upper face portion of the rear side frame 32.

The rear side frame 32 is formed in a closed-section shape by the rear-side-frame upper 41 and a rear-side-frame lower 42 which has a U-shaped section, and the rear-side-frame upper 41 is arranged so as to cover over the rear-side-frame lower 42. Further, the rear-side-frame upper 41 and the rear-side-frame lower 42 of the rear side frame 32 are respectively joined to the rear-wheel-house inner 34a and the floor panel 31.

Further, a third side brace member 45 which extends downward from the rear protrusion portion 35b of the suspension housing member 35 and has a U-shaped section and a fourth side brace member 46 which extends downward from a lower end portion of the third side brace member 45 and has a U-shaped section are attached to the rear-wheel-house inner 34a.

Thus, according to the present embodiment, as shown in FIG. 11, a closed-section portion 43 is formed by the rear-wheel-house inner 34a and the first side brace member 36, and a closed-section portion 44 is formed by the rear-wheel-house inner 34a and the second side brace member 37.

The first side brace member 36 also has, at its lower end portion, a dent portion 36c which is configured to dent toward the inside of the closed-section portion 43 by a specified distance which is substantially equal to the thickness of the second side brace member 37. Thus, an upper end portion of the second side brace member 37 which has substantially the same shape as the lower end portion of the first side brace member 36 is joined to the dent portion 36c of the side brace member 36, overlapping with an upper face of the dent portion 36c of the first side brace member 36, so that a surface (on the vehicle-inside) of the first side brace member 36 and a surface (on the vehicle-inside) of the second side brace member 37 are continuously flat.

A bulkhead 50 as a reinforcing member is provided in the closed-section portion 43 of the first side brace member 36 formed by the first side brace member 36 and the rear-wheel-house inner 34a at a specified position where the dent portion 36c denting toward the inside of the closed-section portion 43 is provided.

Figure 13:
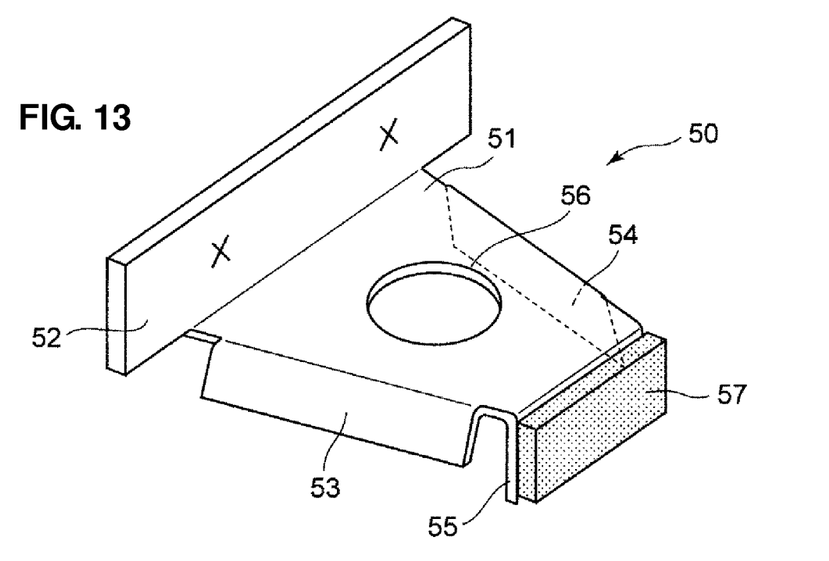
FIG. 13 is a perspective view showing a bulkhead as a reinforcing member according to the second embodiment of the present invention.

FIG. 13 is a perspective view showing the bulkhead as the reinforcing member according to the second embodiment of the present invention. FIG. 13 shows a state in which a damping member is attached to the bulkhead. The bulkhead 50 comprises, as shown in FIG. 13, a partition face portion 51 which partitions the closed-section portion 43, a first flange portion 52 which is provided at a vehicle-outside side portion of the partition face portion 51 and extends upward, second and third flange portions 53, 54 which are provided at a forward side portion and a rearward side portion of the partition face portion 51 respectively and extend downward, and a fourth flange portion 55 which is provided at a vehicle-inside side portion of the partition face portion 51 and extends downward. Herein, a hole portion 56 is formed at the partition face portion 51 for weight reduction.

The first flange portion 51 of the bulkhead 50 is joined to the rear-wheel-house inner 34a by spot welding. The fourth flange portion 55 of the bulkhead 50 faces to the inner face of the first side brace member 36. A viscoelastic member 57 as the vibration damping member which is placed and adheres onto the fourth flange portion 55 is made adhere to the inner face of the first side brace member 36. Thus, the fourth flange portion 55 is joined to the first side brace member 36 via the viscoelastic member 57.

In a state in which the bulkhead 50 is provided in the closed-section portion 43 formed by the first side brace member 36 and the rear-wheel-house inner 34a, the spot-welding joint portions of the bulkhead 50 constitute the rigid joint portions. Meanwhile, the joint portion via the viscoelastic member constitutes the flexible joint portion. In FIG. 13, the spot-welding portions of the bulkhead 50 are shown by x marks.

As described above, according to the vehicle-body structure of a vehicle according to the second embodiment of the present invention, the rigidity of the closed-section portion 43 can be improved by the bulkhead 50 which is provided in the closed-section portion 43 formed by the first side brace member 36 and the rear-wheel-house inner 34a, so that any deformation, collapse of the closed-section portion 43, and the like can be restrained.

In this case, since the first flange portion 52 of the bulkhead 50 is rigidly joined to the rear-wheel-house inner 34a by spot welding and the fourth flange portion 55 of the bulkhead 50 is flexibly joined to the first side brace member 36 via the viscoelastic member 57, the bulkhead 50 can be firmly joined to the rear-wheel-house inner 34a with the rigid joint portions, thereby providing the rigid-improvement effect, and the vibration of the closed-section portion 43 can be reduced with the flexible joint portion, thereby restraining the vibration transmission to passengers in the vehicle compartment.

Thereby, the vibration transmission can be properly restrained, ensuring the sufficient rigidity of the vehicle-body structure, so that the comfortable ride can be improved and the noises can be reduced. Herein, it may not be required to provide any additional member to restrain the vibration transmission, so that the above-described effects can be advantageously provided, avoiding any improper weight increase of the vehicle body or the like.

Further, since the second side frame member 37 as another vehicle-body forming member which is different from the first side frame member 36 is joined to the outer face of the dent portion 36c of the first side frame member 36 forming the closed-section portion 43, the vibration transmission between the first side frame member 36 and the rear-wheel-house inner 34a which form the closed-section portion 43 and the second side brace member 37 can be effectively reduced.

While the viscoelastic member 57 is provided over a whole area of the fourth flange portion 55 of the bulkhead 50 in the present embodiment, a seat portion to place the viscoelastic member 57 thereon may be formed partially at the forth flange portion 55 so that the first side brace member 36 and another part of the fourth flange portion 55 than the above-described seat portion are joined by spot welding and the first side brace member 36 and the fourth flange portion 55 are flexibly joined via the viscoelastic member 57 placed on the seat portion. Thus, the rigid joint portions and the flexible joint portion may be provided at the fourth flange portion 55 of the bulkhead 50.

Herein, while the sheet-shaped viscoelastic member which is relatively thick is used as the damping member and adheres to the bulkhead in the above-described embodiments, a relatively thin viscoelastic member may be used, and also a liquid-type of viscoelastic member may be applied onto the bulkhead.

The present invention should not be limited to the above-described embodiments, and any other further modifications or improvements may be applied within the scope of a sprit of the present invention.

What is claimed is:

1. A vehicle-body structure of a vehicle, comprising:
a first frame member having a closed-section portion extending a longitudinal direction thereof, the first frame member having a dent portion which is formed at an end portion thereof which dents toward an inside of the closed-section portion;
a second frame member having a closed-section portion extending a longitudinal direction thereof, the second frame member being joined to the first frame member so that the closed-section portion of the second frame member is continuous to the closed-section portion of the first frame member, wherein at least part of an end portion of the second frame member which is joined to the end portion of the first frame member overlaps with an outer face of the dent portion of the first frame member so that a surface of the second frame member and a surface of the first frame member are substantially continuously flat; and
a bulkhead having plural joint flange portions provided at a periphery thereof, the bulkhead being provided in the closed-section portion of the first frame member and joined to an inner face of the first frame member through the joint flange portions thereof,
wherein a joint portion of the first frame member and the bulkhead includes a rigid joint portion where the inner face of the first frame member and at least one of the plural joint flange portions of the bulkhead are joined with a direct contact thereof and a flexible joint portion where the inner face of the first frame member and at least one of the plural joint flange portions of the bulkhead are joined via a damping member provided therebetween, and
said flexible joint portion includes a dent-portion joint portion which is configured such that at least one joint flange portion of the bulkhead extends along an inner face of said dent portion of the first frame member and said damping member is provided between said at least one joint flange portion of the bulkhead and said inner face of the dent portion of the first frame member.

2. The vehicle-body structure of a vehicle of claim 1, wherein said at least one joint flange portion configuring the dent-portion joint portion of the bulkhead further constitutes said rigid joint portion where the inner face of the first frame member and the at least one joint flange portion of the bulkhead are joined with the direct contact.

3. The vehicle-body structure of a vehicle of claim 1, wherein said closed-section portion of the first frame member is comprised of two panel members and said closed-section portion of the second frame member is comprised of two panel members, wherein one of said two panel members of the second frame member is formed integrally with one of said two panel members of the first frame member such that the other panel member of the second frame member overlaps with the dent portion formed at the other panel member of the first frame member.

4. The vehicle-body structure of a vehicle of claim 3, wherein said closed-section portion of the first frame member is comprised of a roof rail inner and a roof rail reinforcement, said closed-section portion of the second frame member is comprised of a rear pillar inner and a rear pillar reinforcement, said bulkhead has at least a first joint flange portion extending substantially longitudinally along the rear pillar reinforcement and a second joint flange portion extending substantially longitudinally along the roof rail inner, and said rigid joint portion is provided at both said first joint flange portion and said flexible joint portion, whereas said flexible joint portion is provided only at said second joint flange portion.

5. The vehicle-body structure of a vehicle of claim 1, wherein said rigid joint portion and said flexible joint portion are provided at the different joint flange portions of said bulkhead, respectively.

6. The vehicle-body structure of a vehicle of claim 5, wherein said closed-section portion of the first frame member is comprised of a first side brace member and a rear-wheel-house inner, said closed-section portion of the second frame member is comprised of a second side brace member and the rear wheel-house inner, said bulkhead has at least a first joint flange portion extending substantially upward along the rear-wheel-house inner and a second joint flange portion extending substantially downward along the second side brace member, and said rigid joint portion is provided at said first joint flange portion and said flexible joint portion is provided at said second joint flange portion.

* * * * *